Figure 2:
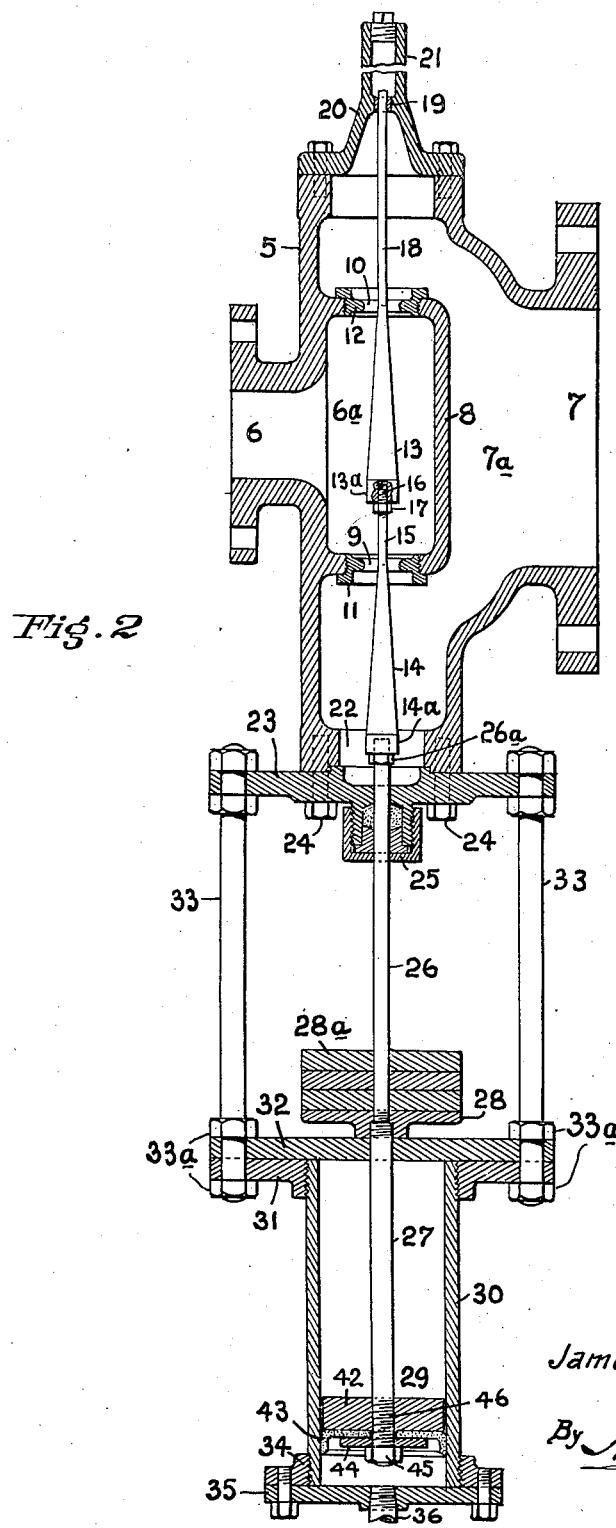

May 30, 1933.     J. L. FITTS     1,911,561
PRESSURE REDUCING VALVE
Filed April 6, 1928     2 Sheets-Sheet 1
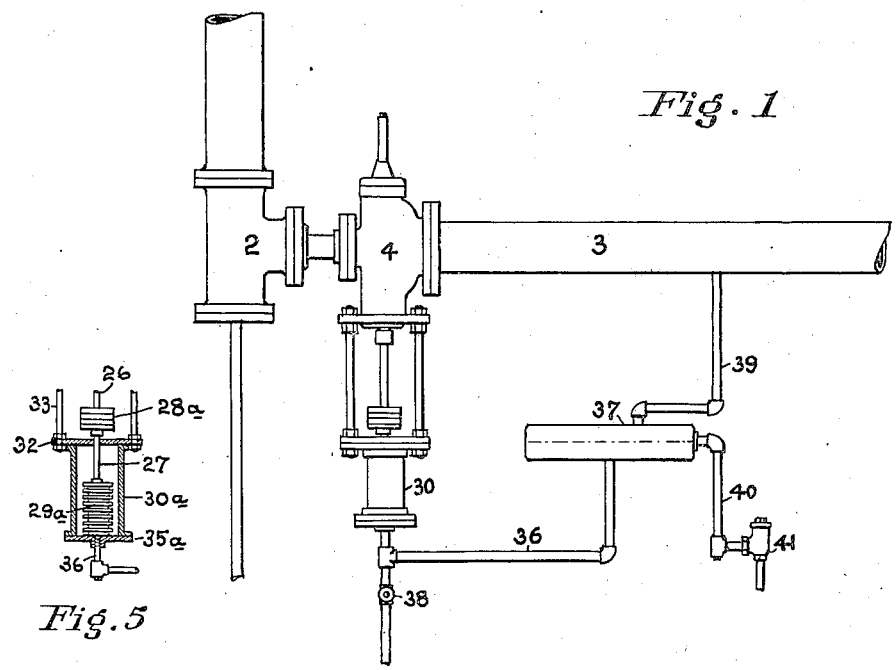
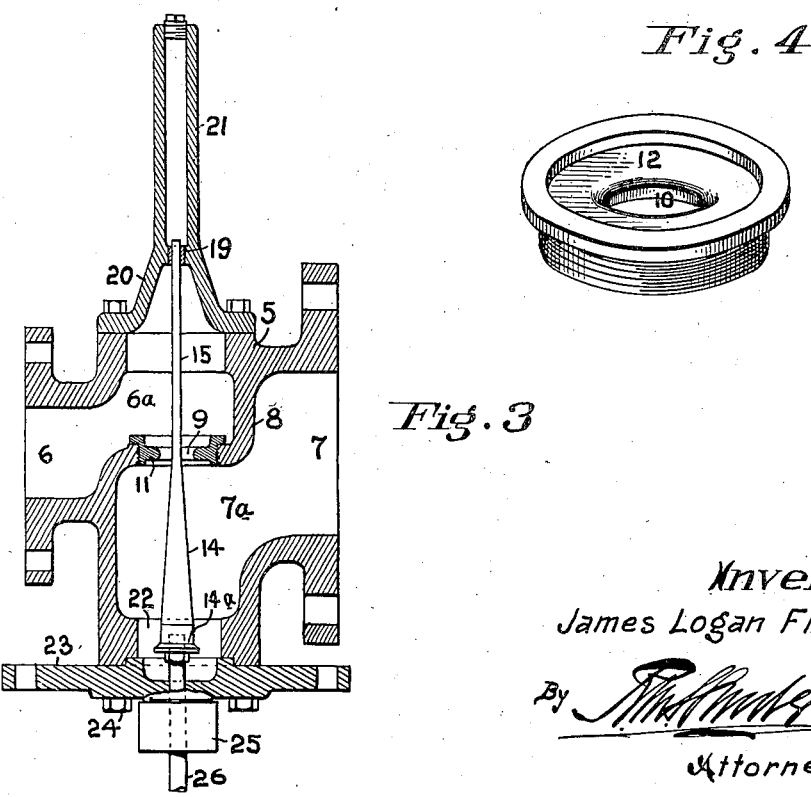
Inventor
James Logan Fitts.
Attorney.

May 30, 1933.  J. L. FITTS  1,911,561
PRESSURE REDUCING VALVE
Filed April 6, 1928  2 Sheets-Sheet 2

Inventor
James Logan Fitts.
By [signature]
Attorney.

Patented May 30, 1933

1,911,561

UNITED STATES PATENT OFFICE

JAMES LOGAN FITTS, OF MERCHANTVILLE, NEW JERSEY, ASSIGNOR TO WARREN WEBSTER & COMPANY, A CORPORATION OF NEW JERSEY

PRESSURE REDUCING VALVE

Application filed April 6, 1928. Serial No. 268,021.

The object of my invention is to provide a commercially practical pressure reducing valve which will be accurately responsive to widely varying conditions such, for example, as when the demand for steam is but a few pounds per hour at a definite final pressure and which then may be increased to a thousand pounds or more of steam per hour, the said valve automatically responsive under such wide variations to hold the final pressure within a relatively small permissible variation from the desired final pressure.

Pressure reducing valves of the diaphragm type with lever and weights, as heretofore employed, do not function through a great change in volumes of steam delivered through the valve without a readjustment of the weights upon the lever when the volume to be delivered is materially increased or decreased. Furthermore, the spring type of pressure reducing valves, as heretofore employed, is not as flexible in results as the lever and weight type, and necessitates even greater special adjustments to suit materially varying volumes of steam passed through the valves in a given time. It may be said that the basic reason for this failure of accuracy in the functioning of pressure reducing valves as heretofore used, where great variations in volumes are to be taken care of, is due to the fact that the movable valve structures are too large and heavy and their lift too short to permit of accurate response to the varying conditions to which they are subjected; also with a long valve movement, operated by a piston or bellows pressure member, the relation between inertia, momentum and friction is at a minimum and therefore the valves will come to rest at a point of more definite area for desired steam flow (at initial pressure) to hold the final pressure desired in the receiving and distributing main.

In the embodiment of my improvements in a commercial structure, the valve may have a single valve piece, but in such case the valve is unbalanced and is affected by the variations in the boiler pressure. When the valve is made of a double type, namely, provided with two valve seats and two valve pieces arranged as a balanced valve, it is not affected by the varying boiler or initial pressure, and will hold steadily at a nearly constant final pressure through a wide range in volume flow of the steam delivered, such slight variations as may occur being due to the limitations of the operating mechanism such as a moving piston in a cylinder, or rod through stuffing box when the valve is closed, the full boiler pressure is effective on the full seat area (same area as valve), but when the valve is wide open only the area of the upper guide stem is affected by the boiler pressure, hence a lower final pressure balances the weight.

While the general features of my improved reducing valve are effective in designs where the movable valve piece is not balanced, it insures very great efficiency when the movable valve pieces are balanced as against the initial or boiler pressure; and this efficiency may be maintained for practically all sizes of reducing valves and variations in the initial or boiler pressures. I have found that the most satisfactory results are secured by making the valve pieces of a long tapered form adapted to be guided through the valve seat orifices without actual or physical seating upon them and by reason of which the valve is responsive to small pressure changes. For very low pressures, the piston below the valve is best made of increased diameter to overcome friction by a larger area for the low pressure to become effective and conversely, for higher terminal pressures the piston may be smaller to reduce the total of counter-balanced weights used which would otherwise be excessive.

I furthermore provide a construction which permits of a large movement in maximum opening and closing of the valve pieces, thereby insuring a more accurate regulation and maintained predetermined final pressure in the receiving mains, irrespective of material pressure changes in the source of supply.

My invention also embodies special features in the motive means for the valve pieces, the same responsive to small pressure changes on the delivery side of the valve; and these, together with the improvements above referred to, are fully described hereinafter and pointed out in the claims.

Referring to the drawings: Fig. 1 is a general elevation showing the assembly of my improved pressure reducing valve with the motive means therefor; Fig. 2 is a vertical section through a balanced pressure reducing valve embodying my invention; Fig. 3 is a vertical sectional view of a single or unbalanced valve piece adapted for use with the motive means shown in Figs. 1 and 2, embodying a modification of my invention; Fig. 4 is a perspective view of one of the valve seats removed from the body; and Fig. 5 is a side view of a modified motor means.

2 is a steam supply main leading from a boiler or other source of initial supply at a pressure greater than the normal pressure under which the steam or other motive fluid is to be utilized, 3 is the distributing main into which the steam or other fluid is delivered and maintained at a substantially constant predetermined pressure, and 4 is my improved pressure reducing valve having its inlet in communication with the main 2 and its outlet in communication with the main 3.

The source of the steam may be a steam boiler or steam street mains or any other source, according to the use of the pressure reducing valve. The receiving main 3 may be the primary main of a steam heating system or for supplying steam for any other purpose or at any pressures desired or found convenient, my invention not being limited to any particular use of the steam or pressure medium.

Primarily, my object is to control by the outlet pressure, namely, that in the main 3, the volume of steam passing through the valve and into the said main.

The special construction of my improved balanced pressure reducing valve, is fully shown in Fig. 2, to which I will now refer. 5 is the valve body having the inlet port 6 and the outlet port 7, the latter being proportionally larger than the former where a relatively great differential in pressures exists between the supply and delivery sides of the system. The valve body is made with an internal division wall 8 providing an inlet compartment 6a and an outlet compartment 7a, which compartments are in communication through ports or orifices 9 and 10, respectively, in valve seats 11 and 12 which are screwed into the division wall at top and bottom and in vertical alinement. These orifices 9 and 10 are formed through diaphragm portions of the valve seats and the apertures are preferably circular and with rounded internal edges. This construction provides a thorofare within the body and between the inlet and outlet ports of the same, and wherein the thorofare includes the valve seat orifices through which the steam is to flow under the control of valve pieces.

13 and 14 are two valve pieces and are of substantially the same shape and size, said valve pieces being tapered and of relatively great length as compared to their diameters. These valve pieces are connected together by an extension 15 from the smallest end of the valve piece 14 which is screwed into the largest end of the valve piece 13 as indicated at 16, and held against looseness by means of a lock nut 17. By this means, the valve pieces may be relatively adjusted in the direction of their length whereby they can be accurately positioned with relation to their respective valve seats. The largest diameter of the tapering valve pieces is adapted to close the ports in the valve seats preferably without actual frictional contact with the walls thereof. For example, in practice, if the diameter of the ports 9 and 10 is .80 of an inch, the largest diameters of the valve pieces 13 and 14 would be approximately .798 of an inch, which would be about two thousandths of an inch difference in diameter. This would permit a very slight leakage when the valve is closed, but this leakage is considered less than the minimum requirements for steam.

As will be seen from Fig. 2, the large ends 13a and 14a of the valve pieces are made cylindrical for a short length, these cylindrical parts being of the largest diameter and are the portions received in the ports or orifices 10 and 9, respectively, when the valve is fully closed. By providing these cylindrical portions, it is possible to have the closure of the valve more assured without friction than if the taper were extended to the largest end, because, in the latter case, there would be liability of the valve pieces actually seating upon the valve seats or of one seating before the other. These actions could not take place with the cylindrical portions present, because the valve would be assured of having both of the cylindrical portions within the ports or seat apertures at the same time and without creating any friction between the valve pieces and their seats.

The upper end of the valve piece 13 is provided with an extended cylindrical guiding part 18 of small diameter which is guided in a bushing 19 in a cap or bonnet 20 bolted to the upper part of the valve body. Said cap 20 is extended upward to provide a chamber 21 forming a closed space in which the rod like guide 18 may travel during the reciprocations of the valve pieces.

The lower part of the valve body 5 is provided with an opening 22 to enable the valve pieces to be introduced when assembling the device, and this opening is normally closed by a head 23 secured in position by bolts 24. This head is provided with a centrally arranged stuffing box 25 through which a vertically operating valve rod 26 is guided, said rod being screwed into the large and lower end of the valve piece 14 and locked therein by a lock nut 26a. Extending downwardly from the head 23 are suspension rods 33, said rods at their lower parts being secured to a plate 32 against the lower surface of which is abutted a cylinder 30. The cylinder 30 is provided at its upper end with a flange 31 into which it is screwed and said flange abuts against the under surface of a plate 32 and is provided with apertures through which the rods 33 extend, said flange 31 and plate 32 being clamped rigidly together by nuts 33a upon the said rods. The lower end of the cylinder 30 is also provided with a flange 34 to which is bolted the head 35 to make a water tight joint. 29 is a piston working within the cylinder 30 and secured to a lower end of the piston rod 27, the upper end of which is guided through the plate 32 and screwed into the hub of a weight supporting disk 28, so that this disk 28 rises and falls with the movement of the piston within the cylinder. The valve rod 26 extends downwardly from the stuffing box 25 and its lower end is screwed into the weight supporting disk 28, so that the valve rod 26 and piston rod 27 move as a unit under the impulses of the piston 29. Weights 28a may be supported upon the disk 28, said weights being varied to correspond to the amount of pressure required to be maintained in the receiving and distributing main 3.

Referring again to Fig. 1, the bottom of the cylinder 30 is in communication with a pipe 36 which is extended upwardly and attached to the bottom of a water accumulator 37. This accumulator may be in the form of a horizontal tank and, in turn, have communication with the low pressure distributing main 3 by means of a pipe 39, said pipe 39 connecting with the accumulator 37 approximately in alinement with the top interior space of the cylinder 30, so that the accumulator may provide a water head operating upon the underside of the piston 29. Where low pressure regulation is required, this water column should have its upper level approximately at the top of the cylinder, so as to insure the water at all times in contact with the piston. The steam pressure existing in the distributing main 3 will exert its pressure upon the water in the water accumulator, and in that manner influence the piston 29 without actually being brought in direct contact therewith.

I do not restrict myself as to the height of the water column provided by the pipe 36 and the accumulator 37, but I prefer that the water column shall be no greater than is necessary to supply the barrier of water between the piston and the steam pipe 39 and whereby it shall not introduce any objectionable pressure that might be detrimental where the pressure in the receiving or distributing pipe 3 is required to be very low.

By providing a drip pipe 40 having thereon a steam trap 41 which will permit the passage of water but prevent the passage of steam, the level of the water in the water accumulator may be maintained at substantially the level of the connection between the accumulator and the pipe 39. Furthermore, the lower end of the pipe 36 may be provided with a drip valve 38 so that the accumulator and cylinder may be emptied of the fluid contents whenever desired. Where the static head in pipe 36 and accumulator 37 below main 3 does not provide a sufficient head desired to counter-balance the weights 28a, the accumulator may be placed higher, even above the main 3 and the overflow pipe 40 to discharge into the said main.

The piston 29 within the cylinder 30 may be of any suitable construction, but I have found the particular construction illustrated excellently adapted for the conditions arising in the use of my improved valve. In the piston construction shown, a circular metal disk 42 of slightly less diameter than the interior bore of the cylinder is screwed upon the lower end of the piston rod 27 and upon the underside of this is placed a cupped leather packing 43, the same being clamped in position upon the disk 42 by a clamping plate 44 clamped down upon the leather by means of a nut 45 screwed upon the piston rod. The pressure of the water acting upon the cupped leather packing 43 makes a liquid tight joint. I have found it desirable that this cupped packing shall be made with the flesh side outward, because that side of the leather shrinks more than the hair side, and hence causes the packing to fit the cylinder better. It is manifest that the piston packing employed should insure a tight joint with least possible friction.

From the foregoing, it will be seen that by adjusting the weights 28a to insure the proper volume of steam at a given reduced pressure in the distributing main 3, said pressure will be exerted upon the underside of the piston 29 with a tendency to raise the same and cause the valve pieces 13 and 14 to throttle their port orifices and, at the same time, the counter-weights aforesaid are operating with a tendency to cause the said valve pieces 13 and 14 to descend and open their ports or orifices, and these opposing forces cooperate to insure the proper adjustment of the valve pieces to permit a maximum flow of steam at the predetermined pressure into the distributing main 3; and the control of the valve pieces under these forces will operate to maintain the distributing pressure substantially constant, irrespective of the pressure which may exist in the main 2 extending to the source of steam supply. The construction here shown is adapted to insure an approximately constant final pressure in the main 3 while permitting a wide range as to the volume flow of the steam passing through the pressure reducing valve, these conditions being largely assured due to the fact that the valve pieces are given a large movement between maximum and minimum flow, are light in weight and thereby eliminate much of the friction heretofore inherent to pressure reducing valves, and avoid the necessity of springs and weighted levers.

While it is desirable that the pressure reducing valve shall embody a balanced valve construction, as shown in Fig. 2, nevertheless, the specific single valve feature, when operated in association with the other elements of a reducing valve, will constitute an embodiment of my invention, although not as efficient as the preferred form. In other words, if the tapered valve piece 13 and the orifice 10 cooperating therewith were omitted from Fig. 1, there would yet remain a pressure reducing valve embodying certain features of my invention, though in said case the efficiency of the valve would be affected by the extent of the boiler or initial pressure and variations therein. These objections would be greatly reduced where the valve was required to operate upon low initial and distributing pressures. Such a modified form of my invention is indicated in Fig. 3, and may employ positive seating.

While my invention is specially intended as a pressure reducing valve for controlling the supply of steam to a heating or other system, I do not confine the use to steam; and, therefore, when reference is made to steam, it is to be understood to include any other vapors, fluids or gases for the control of which the device may be adapted.

While the piston and cylinder motor means for operating the valve pieces 13 and 14 are well suited for the purpose, I may employ in lieu of the piston an expansible bellows 29a, shown in Fig. 5, arranged within a cylinder 30a and having its free end connected with the rod 27 and with its fixed end connected to the cylinder head 35a, so that the pressure of the fluid in pipe 36, supplemented by the steam pressure of steam main 3, may be exerted within the bellows 29a to cause it to expand or collapse, and thereby operate the valve pieces with minimum friction.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details as the same are susceptible of modification in various particulars without departing from the spirit or scope of the invention.

Having now described my invention, what I claim and desire to secure by Letters Patent is:

1. In a pressure reducing balanced valve, the combination of a body having inlet and outlet ports of different sizes and a thorofare between the said ports and also having two widely separated valve controlled orifices in fixed alignment and respectively in communication with both the inlet and outlet ports of the valve body, two long and very gradually tapered valve pieces connected end-to-end to move in unison and each tapered valve piece greatly longer than the thickness of its seat, said valve pieces being respectively arranged to extend through the valve orifices and each bearing to its orifice the same relation and proportion for simultaneously controlling the flow of steam therethrough, a motor device comprising a long cylinder fixedly suspended below the valve body and providing a space between it and the valve body greatly more than the extent of movement of the valve pieces relatively to the orifices, a rod extending from the motor device downward and having its upper end connecting with the lowermost of the valve pieces, a stuffing box carried at the lower part of the valve body through which the valve rod extends from the inside to the outside thereof and is guided, a support secured to the rod outside of the valve body and movable in the space between the cylinder of the motor device and valve body, counter-weights carried by the support, and an unobstructed communication between the bottom of the motor device and the outlet port of the valve body and sustaining a static head upon the piston whereby the pressure on the outlet side of the valve is indirectly caused to react upon the bottom of the motor device in opposition to the counter-weights.

2. In a pressure reducing balanced valve, the combination of a body having inlet and outlet ports and a thoroughfare between said ports having valve seat orifices each in communication with both the inlet and outlet ports of the body, two complete valve pieces connected in tandem and guided normally out of contact with the seat orifices to move as a unit, an operating stem for the valve pieces extending to a considerable distance below the valve body, guiding means for directly guiding one of the valve pieces and indirectly causing the other valve piece to be guided in unison with the first mentioned valve piece, motor means for simultaneously moving the valve pieces comprising a piston upon the valve stem and a cylinder in which the piston moves, said cylinder suspended below and rigidly connected with the valve body and in alignment with the piston and valve pieces within the body, adjustable weights upon the valve stem at the under side of the valve body and above the cylinder, a water reservoir arranged at or above a level corresponding to the upper part of the cylinder, a pipe connecting the space within the cylinder below the piston therein with the lower part of the water reservoir, and a connecting pipe providing a pressure communication between the reservoir and the outlet port of the valve body.

3. The invention according to claim 2, wherein further, the water reservoir is provided with a drain pipe having a steam trap to permit the escape of excess water but to prevent the passage of steam.

In testimony of which invention, I hereunto set my hand.

JAMES LOGAN FITTS.